United States Patent
Saito et al.

(10) Patent No.: US 8,582,410 B2
(45) Date of Patent: Nov. 12, 2013

(54) MASTER STRATEGY ADJUSTMENT METHOD AND DISC MANUFACTURING METHOD

(75) Inventors: Akiya Saito, Kanagawa (JP); Toru Aida, Kanagawa (JP); Shinobu Hayashi, Shizuoka (JP)

(73) Assignees: Sony Corporation (JP); Sony DADC Corporation (JP)

( * ) Notice: Subject to any disclaimer, the term of this patent is extended or adjusted under 35 U.S.C. 154(b) by 0 days.

(21) Appl. No.: 13/411,975

(22) Filed: Mar. 5, 2012

(65) Prior Publication Data

US 2012/0236697 A1    Sep. 20, 2012

(30) Foreign Application Priority Data

Mar. 15, 2011    (JP) .................................. 2011-056186

(51) Int. Cl.
    *G11B 7/00*    (2006.01)
(52) U.S. Cl.
    USPC .................. 369/53.41; 369/84; 369/59.11
(58) Field of Classification Search
    USPC .......... 369/47.12, 47.13, 53.11, 275.4, 275.3, 369/275.1, 272.1, 53.35, 53.41, 84, 59.11; 720/718
    See application file for complete search history.

(56) References Cited

U.S. PATENT DOCUMENTS

| | | | | |
|---|---|---|---|---|
| 6,977,785 B2 * | 12/2005 | Nakamura et al. | ............... | 360/17 |
| 7,099,094 B2 * | 8/2006 | Nakamura et al. | ............... | 360/17 |
| 8,089,843 B2 * | 1/2012 | Aida et al. | .................. | 369/59.12 |
| 2003/0147323 A1 * | 8/2003 | Sako et al. | .................. | 369/53.22 |
| 2003/0193882 A1 * | 10/2003 | Suenaga et al. | ............. | 369/275.4 |
| 2005/0130335 A1 * | 6/2005 | Ito et al. | .......................... | 438/22 |
| 2005/0161842 A1 * | 7/2005 | Kai et al. | ...................... | 264/1.33 |
| 2007/0211614 A1 * | 9/2007 | Paffen et al. | ............... | 369/275.3 |
| 2009/0296551 A1 * | 12/2009 | Vlutters | ...................... | 369/53.22 |
| 2010/0188964 A1 * | 7/2010 | Umezawa et al. | .......... | 369/275.1 |

FOREIGN PATENT DOCUMENTS

JP    2009-064542 A    3/2009

* cited by examiner

*Primary Examiner* — Thomas Alunkal
(74) *Attorney, Agent, or Firm* — Lerner, David, Littenberg, Krumholz & Mentlik, LLP

(57) ABSTRACT

A master strategy adjustment method includes performing first recording on a master with a predetermined strategy, performing first measurement of an evaluation value of the master of the first recording, forming a first optical disc based on the master after the first recording, performing second measurement of an evaluation value of the optical disc formed as the first optical disc, calculating a target value of the evaluation value of the master based on a difference with the first measurement evaluation value and the second measurement evaluation value, and adjusting the strategy so that the evaluation value with regard to the master matches the target value, performing recording on the master with the adjusted writing strategy, performing measurement of the evaluation value of the master, and performing determination of whether the evaluation value is within a predetermined range with the target value as a reference until an affirmative result is obtained.

7 Claims, 8 Drawing Sheets

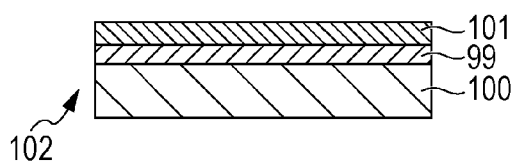
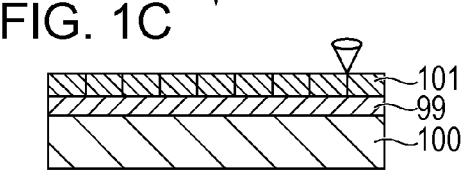
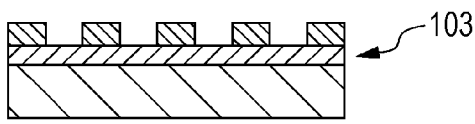
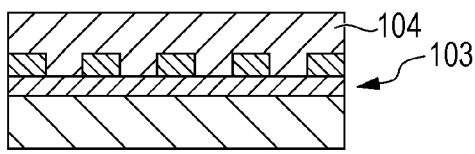
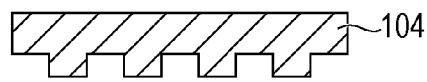
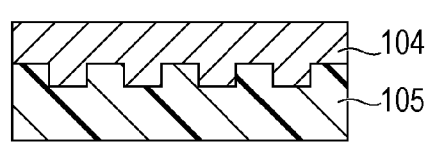
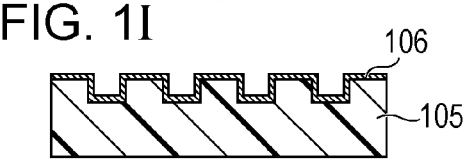
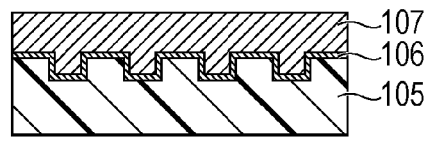

MASTER STRATEGY ADJUSTMENT METHOD AND DISC MANUFACTURING METHOD

CROSS-REFERENCE TO RELATED APPLICATION

The present application claims priority from Japanese Patent Application No. JP 2011-056186 filed in the Japanese Patent Office on Mar. 15, 2011, the entire content of which is incorporated herein by reference.

BACKGROUND

The present disclosure relates to a method for adjusting a writing strategy for recording (exposing) with regard to a disc master (master strategy adjustment method). In addition, the present disclosure relates to a method of manufacturing an optical disc recording medium which is created based on the disc master.

There is recording of information using a combination of pits and lands in, for example, an optical disc recording medium such as a CD (Compact Disc), a DVD (Digital Versatile Disc), or a BD (Blu-ray Disc: registered trademark) as a so-called ROM (Read Only Memory) type. That is, there is recording of information using a formation pattern with a concave section as a pit and a convex section as land.

In manufacturing of a ROM type optical disc recording mediums such as this, first, information recording is performed by a laser light illumination being performed with regard to an optical disc master where a photo-sensitive layer is formed. Then, after a master where recording is completed where a pit has been formed is created by a development process with regard to the optical disc master where a recording process has been carried out in this manner and a stamper is created which transfers a pit pattern (thus, recording information) which is formed on the master where recording is completed, the optical disc recording medium is manufactured by a substrate being formed with the recording information being reproduced by injection molding or the like using the stamper and by depositing or the like of a reflecting film with regard to the substrate.

In a method for manufacturing an optical disc recording medium such as this, in recent years, a PTM (Phase Transition Mastering) method has been adopted in the recording process (mastering process) in order to support higher recording density in optical disc recording mediums. It is referred to as so-called thermography.

In the PTM method, an inorganic resist is used as a photoresist which configures a photo-sensitive layer. A semiconductor laser is used as a recording laser.

Here, in the method in the related art where the PTM method is not adopted, an organic resist is used as the photosensitive layer. In this case, a portion which is exposed using a laser remains as a pit since exposure of the photoresist is so-called optical recording. That is, the laser spot diameter as it is has an effect on pit width.

On the other hand, in the PTM method, characteristics of an inorganic resist are changed (that is, chemical characteristics are changed) by heat being applied in accompaniment to irradiation of laser light and a recording mark is formed. The inorganic resist which is used in the PMT method exhibits remarkable changes in chemical properties at a portion where heat is concentrated, and the size of a groove which is formed is not directly affected by the laser spot diameter. That is, due to this point, it is possible to perform more precise groove formations in the PTM method than in the method in the related art.

However, it is necessary to set an appropriate writing strategy even in a case where laser illumination is performed according to a recording signal in order to manufacture the disc master. For example, with regard to the disc master for manufacturing an optical disc with a bit length as 2 T to 9 T (where T is a channel clock), exposure which corresponds to 2 T to 9 T pits is performed using laser illumination during the recording of the disc master. At this time, for each bit length of 2 T to 9 T, it is possible to achieve an improvement in product quality of pit rows of the optical disc which is eventually manufactured by appropriately adjusting a strategy pattern (recording drive waveform which is applied to a laser light emission section).

At this time, in a case where the PTM method is adopted in the recording process of the master, strategy adjustment during master recording in this manner is able to be executed without carrying out a development process (forming process of the pit) with regard to the master.

That is, as is shown in Japanese Unexamined Patent Application Publication No. 2009-64542, in a case where the PTM method is adopted, it is possible to read out a signal, which is recorded in the formation portion and other portions, using laser light illumination using reproduction power without a concave section being formed as a pit due to the development process since there is deforming (warping) in the portion where laser light is illuminated in the inorganic resist. That is, it is possible to perform measurement of an evaluation value according to strategy adjustment based on the signal which is read out in this manner.

It is possible to considerably improve the operational efficiency since it is sufficient if the processes after the development process are not performed in the measurement of the evaluation value for strategy adjustment.

However, it is necessary to improve the signal quality of the optical disc as the final product, not the master.

Normally, the evaluation value which is measured from the optical disc may not necessarily become an optimal value even if the evaluation value which is measured from the master is adjusted to be an optimal value. This is because there may be differences in the bit length which is formed on the master and the optical disc due to various causes in the processes since there are many processes such as stamper forming, substrate forming, and depositing from the forming of the master to the creation of the optical disc.

Due to this, in a case where the efficiency of the strategy adjustment operation is achieved due to the method described in Japanese Unexamined Patent Application Publication No. 2009-64542 described above (that is, the processes from the development process to the forming of the optical disc are omitted), a value, where the evaluation value which is measured from the optical disc is set to be an optimal value as the target value of the evaluation value which is used in strategy adjustment and not the optimal value of the evaluation value which is measured from the master, is determined using experiments, calculations, and the like in advance and strategy adjustment is performed so as to match the target value which is determined in this manner.

However, the determining of the target value where the evaluation value which is measured from the optical disc in this manner is optimized in advance is extremely difficult in practice in terms of the characteristics where the deviations which occur between the master and the optical disc in the manner described above.

Therefore, in order so that signal quality of the optical disc as a final product is appropriate in practice, it is realistic that the forming of the optical disc and the measuring of the evaluation value thereof is performed each time and strategy adjustment of the master is performed based on the result of measuring of the evaluation value of the optical disc.

For confirmation, a specific process of an adjustment method of a master strategy such as this will be described with reference to a flowchart of FIG. 8.

First, recording is performed with regard to a master (step S1) and an optical disc is created based on the master after recording (step S2).

After this, the measuring of the evaluation value with regard to the optical disc which has been created is performed (step S3) and whether or not the evaluation value is within a permissible range is identified (step S4).

Adjustment of a master strategy which is based on the result of measuring the evaluation value is performed as a strategy adjustment process in a case where the evaluation value is within a permissible range (step S5). Specifically, adjustment of the strategy, where the evaluation value which is measured in step S3 is an optimal value, is performed. After the strategy adjustment process such as this, the process is executed again from the master recording (step S1). That is, due to this, the adjustment of the strategy is repeated until the evaluation value which is measured from the optical disc is within the permissible range.

According to the method described above, it is possible to more reliably manufacture a high-quality optical disc by adjusting the master strategy based on the evaluation value which is measured from the optical disc.

SUMMARY

However, in a case of the strategy adjustment using the method described above, the operational efficiency of the strategy adjustment remarkably deteriorates since the forming of the optical disc is performed each time.

In addition, for strategy adjustment, there is a concern that it may be necessary to create a large number of optical discs which are not able to be used as a final product and that unnecessary consumption of material in the forming of the master, the stamper, and the optical disc may be encouraged.

It is desirable that improvement of operational efficiency of master strategy adjustment and prevention of waste of material in forming of optical discs be achieved by achieving a reduction in the number of times of forming unnecessary optical discs for strategy adjustment while achieving prevention of a reduction in product quality of the optical discs as final products.

According to an embodiment of the present disclosure, the following is proposed as a master strategy adjustment method.

That is, there is performing first recording with regard to a disc master in a state where a predetermined writing strategy is set.

In addition, there is performing first measurement of an evaluation value which is an evaluation indicator of signal quality with regard to a signal which is recorded with regard to the disc master in the performing of first recording.

In addition, there is forming a first optical disc recording medium based on the disc master where recording has been performed in the performing of first recording.

In addition, there is performing second measurement of an evaluation value with regard to a recording signal of the optical disc recording medium which was formed in the forming of the first optical disc.

In addition, there is calculating of a target value of the evaluation value with regard to the disc master based on a difference with the evaluation value which was measured in the performing of first measurement and the evaluation value which was measured in the performing of second measurement.

Furthermore, there is adjusting the first writing strategy which was set in the performing of first recording so that the evaluation value with regard to the disc master matches the target value, performing recording with regard to the disc master in a state where the adjusted writing strategy is set, performing measurement of the evaluation value with regard to the recording signal of the disc master, and performing a process, where it is determined whether or not the evaluation value which has been measured is at least a value within a predetermined range with the target value set as a reference, until an affirmative result is able to be obtained in the determination.

According to another embodiment of the present disclosure, the following is proposed as a disc manufacturing method.

That is, there is performing first recording with regard to a disc master in a state where a predetermined writing strategy is set.

In addition, there is performing first measurement of an evaluation value which is an evaluation indicator of signal quality with regard to a signal which is recorded with regard to the disc master in the performing of first recording.

In addition, there is forming a first optical disc recording medium based on the disc master where recording has been performed in the performing of first recording.

In addition, there is performing second measurement of an evaluation value with regard to a recording signal of the optical disc recording medium which was formed in the forming of the first optical disc.

In addition, there is calculating of a target value of the evaluation value with regard to the disc master based on a difference with the evaluation value which was measured in the performing of first measurement and the evaluation value which was measured in the performing of second measurement.

In addition, there is adjusting the first writing strategy which was set in the performing of first recording so that the evaluation value with regard to the disc master matches the target value, performing recording with regard to the disc master in a state where the adjusted writing strategy is set, performing measurement of the evaluation value with regard to the recording signal of the disc master, and performing a process, where it is determined whether or not the evaluation value which has been measured is at least a value within a predetermined range with the target value set as a reference, until an affirmative result is able to be obtained in the determination.

Furthermore, there is performing third recording with regard to the disc master in a state where the strategy is set based on the writing strategy which is set when the affirmative result was obtained in the determination and forming a third optical disc recording medium based on the disc master where recording has been performed in the performing of third recording.

In the embodiments of the present disclosure as described above, measurement of the evaluation value with regard to the disc master, where the recording has been performed using the predetermined strategy setting, is performed (the performing of the first measurement of the evaluation value), an optical disc recording medium is formed once based on the disc master where the recording has been performed (the first forming of the disc), and measurement of the evaluation value with regard to the optical disc recording medium is performed (the performing of the second measurement of the evaluation value). Then, the target value of the evaluation value with regard to the disc master is calculated based on the difference with the evaluation value with regard to the master and the evaluation value of the optical disc recording medium (the calculating of the target value). After this, adjustment of the master strategy is performed so that the evaluation value with regard to the disc master matches the target value, recording with regard to the disc master is performed in a state where the adjusted writing strategy is set, measurement of the evaluation value with regard to the recording signal of the disc master is performed, and the process, where it is determined whether or not the evaluation value which has been measured is at least a value within a predetermined range with the target value set as a reference, is performed until an affirmative result is able to be obtained in the determination (the first adjusting of the writing strategy).

By adopting a sequence where adjustment of the master strategy is performed so that the evaluation value matches the target value after the target value of the evaluation value of the master is calculated from the difference with the evaluation value of the master and the evaluation value of the optical disc recording medium by performing up until the forming once of the optical disc recording medium in this manner (strategy adjustment where the evaluation value with regard to the recording signal of the master tracks the target value), it is possible to suppress the number of times of forming the optical disc recording medium which is necessary for strategy adjustment to at least one time.

That is, by achieving a reduction in the number of times of forming the optical disc recording medium for strategy adjustment which are unnecessary, it is possible to achieve an improvement in operational efficiency of the master strategy adjustment and prevention of wasting of materials according to the forming of optical discs.

At this time, since strategy adjustment is performed to reflect the evaluation value of the optical disc recording medium which are actually formed in strategy adjustment, to that extent, it is possible to increase signal quality of the optical disc recording medium.

According to the embodiments of the present disclosure, it is possible to achieve an improvement in operational efficiency of the master strategy adjustment and prevention of wasting of materials according to the forming of optical discs by achieving prevention of a reduction in product quality of the optical disc recording medium which is a final product and achieving a reduction in the number of times of forming the optical disc recording medium for strategy adjustment which are unnecessary.

BRIEF DESCRIPTION OF THE DRAWINGS

FIGS. 1A to 1J are diagrams for describing a process for manufacturing an optical disc recording medium;

DETAILED DESCRIPTION OF EMBODIMENTS

Figure 2:
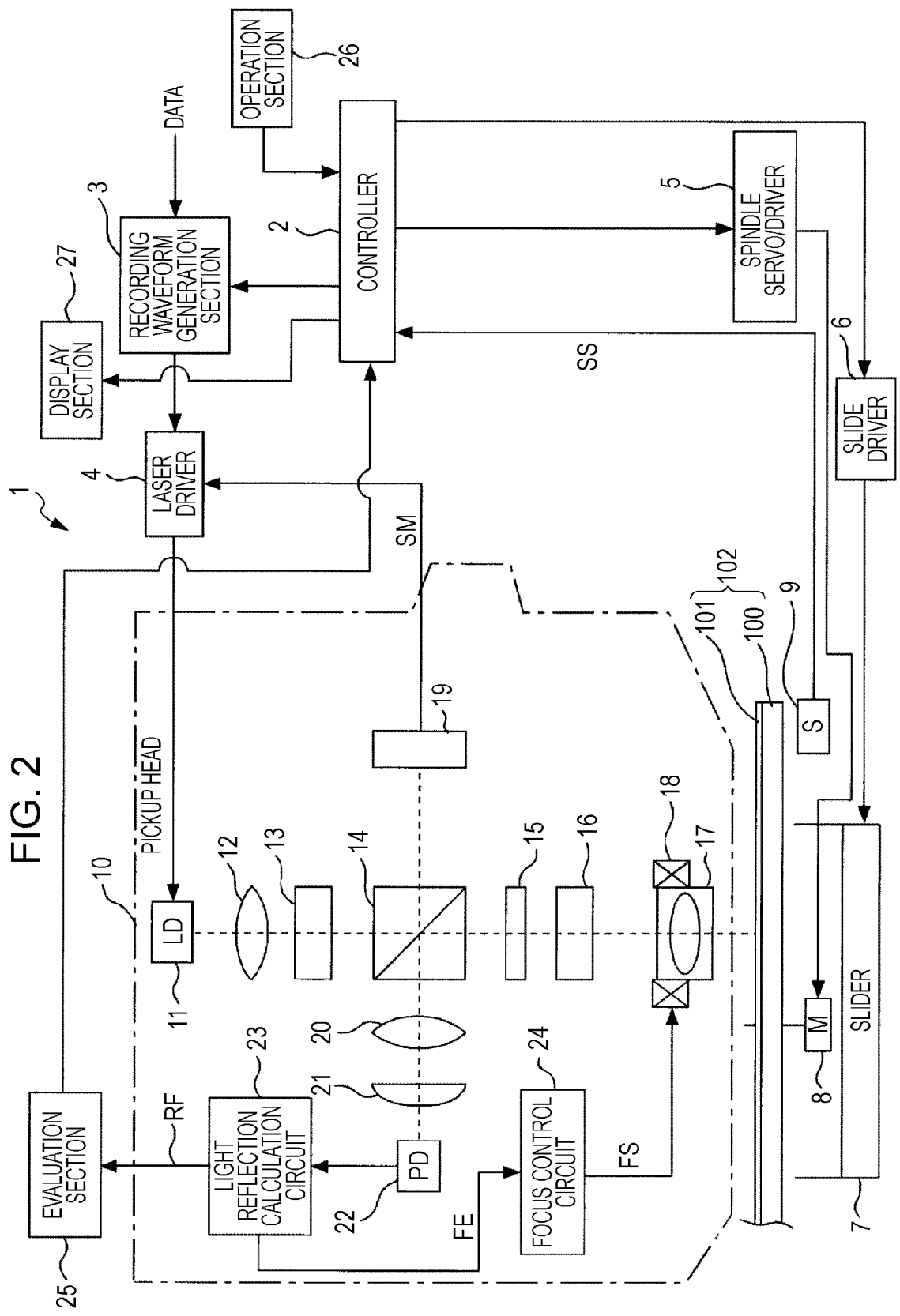
FIG. 2 is a diagram illustrating a configuration example of a master recording device.

Below, an embodiment according to the present disclosure will be described.

Here, the description will be performed in the order below.
[1. Disc Manufacturing Sequence]
[2. Master Recording Device Configuration Example]
[3. Concept of Strategy Adjustment of Embodiment]
[4. Improving Reliability of Master Evaluation Value]
[5. Confirmation Process]
[6. Specific Strategy Adjustment Method]
[7. Modified Examples]
[1. Disc Manufacturing Sequence]

First, a process for manufacturing an optical disc recording medium will be described using FIGS. 1A to 1J.

In FIGS. 1A to 1J, as a process for manufacturing optical disc recording media there may be broad classification as a master manufacturing process, a recording process (exposure sequence), a developing process, a mold (stamper) manufacturing process, or a recording medium manufacturing process.

Here, the optical disc recording medium referred to in the specifications indicates a recording medium with a disc shape where recording information is read out by the illumination of light. Below, the optical disc recording medium may also be referred to simply as an optical disc.

FIG. 1A illustrates a master forming substrate 100 which is configured of an optical disc master (referred to below simply as disc master or master). First, an inorganic resist layer 101 which is formed from resist materials of an inorganic system is uniformly deposited (resist layer forming sequence, FIG. 1B) on the master forming substrate 100 by a sputtering method. Due to this, first, an inorganic resist master 102 (pre-recording master) is formed.

In this example, as a mastering process in which a disc master is manufactured, mastering with a PTM method is performed using a resist material of an inorganic system.

At this time, as the material provided as the resist layer 101, incomplete oxides of transition metals may be used. As a specific transition metal, for example, there is Ti, V, Cr, Mn, Fe, Nb, Cu, Ni, Co, Mo, Ta, W, Zr, Ru, Ag, or the like.

Here, the specific material of the resist layer 101 is not particularly limited as long as the material (sensitive to light due to a thermal reaction which accompanies laser light illumination) is capable of so called thermography.

Here, in order to improve the exposure sensitivity of the inorganic resist layer 101, a predetermined intermediate layer 99 may be formed between the substrate 100 and the resist layer 101, the shape of which is illustrated in FIG. 1B. In any case, it is sufficient if the resist layer 101 is deposited so as to be exposed to the outer section on the upper layer of the substrate 100 so that it is capable of light sensitivity according to laser optical illumination during exposure.

In addition, in this case, as the master forming substrate 100, for example, a Si wafer substrate may be used and the deposition of the resist layer 101 described above is performed by sputtering. In this case, DC or RF sputtering is used as the deposition method.

Next, the selective exposure corresponding to the signal pattern of the resist layer 101 is exposure and light sensitized (resist layer exposure process, FIG. 1C).

Here, this exposure process (recording process) is performed by using the master recording device 1 which will be described later.

Then, a disc master 103 (also referred to below as a post-development master 103), where a predetermined concave and convex pattern is formed, is formed by development of the resist layer 101 (resist layer development process, FIG. 1D). In the resist layer development process, as a specific development method, it is possible that there is a dipping method by immersion, alternatively, a method of coating a chemical solution on the master 102 which is rotated by a spinner, or the like.

With regard to the developing liquid, for example, an organic alkali developing liquid such as TMAH (tetramethylammonium hydroxide), or an inorganic alkali developing liquid such as a KOH, NaOH, phosphoric acid may be used.

Next, after washing the post-development master 103 which is formed as described above with water, a metal master is manufactured using an electroforming bath (electroforming process, FIG. 1E). Then, after the electroforming, a stamper 104 for molding is obtained which transfers a concave and convex pattern of the post-development master 103 by the separation of the post-development master 103 and the metal master (FIG. 1F). In this case, Ni is used as the material of the metal master (stamper 104) described above.

Here, before the electroforming process of FIG. 1E is performed, it is possible to improve the mold release characteristics by performing the separation process of the surface of the post-development master 103, and the separation process is performed according to necessity.

It is sufficient for the improvement of mold release characteristics that, for example, any one of the processes which are illustrated below is performed in regard to the post-development master 103.

1) Immersion for several minutes in alkali liquid which is heated to 40-60°.
2) Electrolytic oxidization while immersed for several minutes in an electrolytic alkali liquid which is heated to 40-60°.
3) Formation of an oxide film using RIE or the like.
4) Depositing of metal oxide film using a depositing device.

Or alternatively, it is possible to realize improvement of mold release characteristics by a material of a composition which has an oxygen composition ratio that more easily releases from a mold in regard to the metal master being selected as a predetermined inorganic resist material.

Here, after the stamper 104 is manufactured, the post-development master 103 is washed with water and then kept in the dried state. The desired number of stampers 104 may be repeatedly manufactured according to necessity.

Next, a resin disc substrate 105 is formed from polycarbonate, which is a thermoplastic resin, by injection molding using the stamper 104 (FIG. 1G).

After that, the stamper 104 is separated (FIG. 1H), and an optical disc is formed by the deposition of a reflective coating 106 such as an Ag alloy on the concave and convex surface of the resin disc substrate 105 (FIG. 1I) and a protective coat 107 of coat thickness of approximately 0.1 mm, (FIG. 1J). That is, due to this, the optical disc recording medium where information is stored by using the concave and convex pattern is obtained.

[2. Master Recording Device Configuration Example]

A configuration example of the master recording device 1 of the present example which performs mastering with a PTM method is shown in FIG. 2.

In the mastering process, the master recording device 1 performs forming of a recording mark is performed by a thermographic action according to the laser light illumination in regard to a pre-recording master 102 where the inorganic resist 101 is formed.

In FIG. 2, the master recording device 1 is provided with a configuration where a dashed line is shown which is a pickup head 10. In the pickup head 10, a laser light source 11 which is a semiconductor laser sets a wavelength according to the type of optical disc recording medium which is to be manufactured. In the case of this example, a wavelength of approximately 405 nm is set corresponding to BD.

After being made to be parallel light by the collimator lens 12, the laser light irradiated from the laser light source 11 is guided to a polarized light beam splitter 14 with a spot shape being, for example, converted into a circle shape by the anamorphic prism 13.

Then, the polarized component which is transmitted by the polarized light beam splitter 14 is guided to an object lens 17 through a $\lambda/4$ wavelength plate 15 and a beam expander 16, and is illuminated onto the inorganic resist master 102 by being condensed the object lens 17.

As described above, the laser light which is irradiated to the master 102 through the object lens 17 joins the focal point on the inorganic resist 101 of the master 102. By the inorganic resist 101 absorbing the laser beam, crystallization occurs at a portion which is heated to a high temperature which is particularly near the center of the illumination section.

By this action, a resist pattern is formed on the inorganic resist layer 101.

The laser light which is reflected in the polarized light beam splitter 14 is illuminated onto a monitor detector 19 (photo detector for monitoring laser power). The monitor detector 19 outputs a light intensity monitor signal SM in accordance with the amount of received light (light intensity) of the laser light.

On the other hand, returning light of the laser light which is illuminated onto the inorganic resist master 102 passes through the object lens 17, the beam expander 16, and the $\lambda/4$ wavelength plate 15, and reaches the polarized light beam splitter 14.

Here, as previously described in Japanese Unexamined Patent Application Publication No. 2009-64542, in the case where the PTM method is adopted, it is possible to read out the recording signal by using the difference of the exposure portion and the non-exposure portion by the conversion of the exposure portion in the inorganic resist layer 101. That is, in the stage before development, reading out of the recording signal is possible.

Here, the returning light of the laser light which reaches the polarized light beam splitter 14 as described above rotates the polarized light surface by 90° due to the two passes of the outward path and the return path of the $\lambda/4$ wavelength plate 15, and is reflected by the polarized light beam splitter 14. The returning light which is reflected by the polarized light beam splitter 14 is received at the light reception surface of a photo detector 22 through a light focusing lens 20 and a cylindrical lens 21.

The light reception surface of the photo detector 22 is, for example, provided with four reception surfaces, and is able to obtain a focus error signal due to astigmatism.

At each reception surface of the photo detector 22, an electric current signal is output according to the amount of received light, and is supplied to a reflected light calculation circuit 23.

The reflected light calculation circuit 23 converts the electric current signal from each of the four light reception surfaces to a voltage signal and generates the focus error signal FE by performing a calculation process as a astigmatism method.

In addition, an RF signal (reproduction signal of the recording signal of the master 102) as a sum signal is also generated.

As shown in the diagrams, the focus error signal FE is supplied to a focus control circuit 24, and the RF signal is supplied to the evaluation section 25 which will be described later.

The focus control circuit 24 forms a servo driving signal FS of an actuator 18 where the object lens 17 is held so as to be able to be moved in the focus direction based on the focus error signal FE. Then, the focus servo is executed by the actuator 18 driving the object lens 17 in a direction of separating with regard to the inorganic resist master 102 based on the servo driving signal FS.

The inorganic resist master 102 is rotationally driven by a spindle motor 8. The spindle motor 8 is rotationally driven while the rotational speed is controlled by a spindle servo/driver 5. Due to this, the inorganic resist master 102 is, for example, is rotated at a predetermined line speed.

A slider 7 is driven by a slide driver 6, the inorganic resist master 102 is loaded, and the entirety of a base which includes a spindle structure is moved. That is, a groove section (pit row: track), which is formed at the inorganic resist layer 101, is formed in a spiral shape by the inorganic resist master 102 being exposed in the state of being rotated by the spindle motor 8 using the above described optical system while being moved in the radial direction by the slider 7.

The movement position due to the slider 7, that is, the exposure position (disc radial position: slider radial position) of the inorganic resist master 102 is detected by a sensor 9. Position detection information SS from the sensor 9 is supplied to a controller 2 which will be described below.

The evaluation section 25 measures a predetermined evaluation value of a position which is an evaluation indicator of signal quality in regard to a recording signal of the master 102 based on an RF signal.

Here, in the case of the present example, as the evaluation value described above, the length of the portion which is to be a pit in the recording signal (a portion which becomes a concave portion due to the developer), and the value which is the evaluation indicator in regard to the position thereof are measured. Specifically, measurement of the evaluation value is performed in regard to at least one of a reading edge (front edge) position of the pit section, and a trailing edge (rear edge) position.

In addition, this evaluation value is performed by separate classification for each pit length (code length).

An evaluation value which is calculated separately for each code length using the evaluation section 25 is supplied to the controller 2.

The controller 2, for example, is configured by a microcomputer and performs overall control of the master recording device 1. For example, control of the recording position on the master 102 is performed by performing a spindle rotational action control in regard to a spindle servo/driver 5, a movement action control of the slider 7 using a slide driver 6, and the like.

In addition, particularly in the case of the present example, image display is executed where a measurement result or the like of the evaluation value using the evaluation section 25 is displayed at the center of a diagram of a display section 27, and in addition, a setting process of a writing strategy based on an instruction from a user (an operator) is also performed based on operation input information from an operation section 26.

A recording waveform generation section 3 obtains a recording conversion code row by performing a predetermined recording conversion encoding process with regard to the input data and performs generation of a recording waveform in accordance with a recording conversion code row based on a writing strategy which is instructed by the controller 2.

The laser driver 4 inputs a recording waveform (recording drive signal) which is generated by the recording waveform generation 3 and drives the laser light source 11 in the pickup head 10. The laser driver 4 applies a light emission driving current to the laser light source 11 according to the recording drive signal.

Here, the light intensity monitor signal SM is also supplied from the monitor detector 19 with regard to the light driver 4. The laser driver 4 is able to also perform laser light emission control based on the result of the comparison of the light intensity monitor signal SM and a reference value.

[3. Concept of Strategy Adjustment of Embodiment]

The master strategy adjustment sequence of the embodiment refers to an adjustment sequence for determining the strategy which is optimized as the writing strategy which is to be set during master recording in the manufacturing process of the optical disc recording medium which is described in FIG. 1.

Below, the concept of the master strategy adjustment sequence of the embodiment will be described with reference to the flowchart of FIG. 3.

Figure 3:
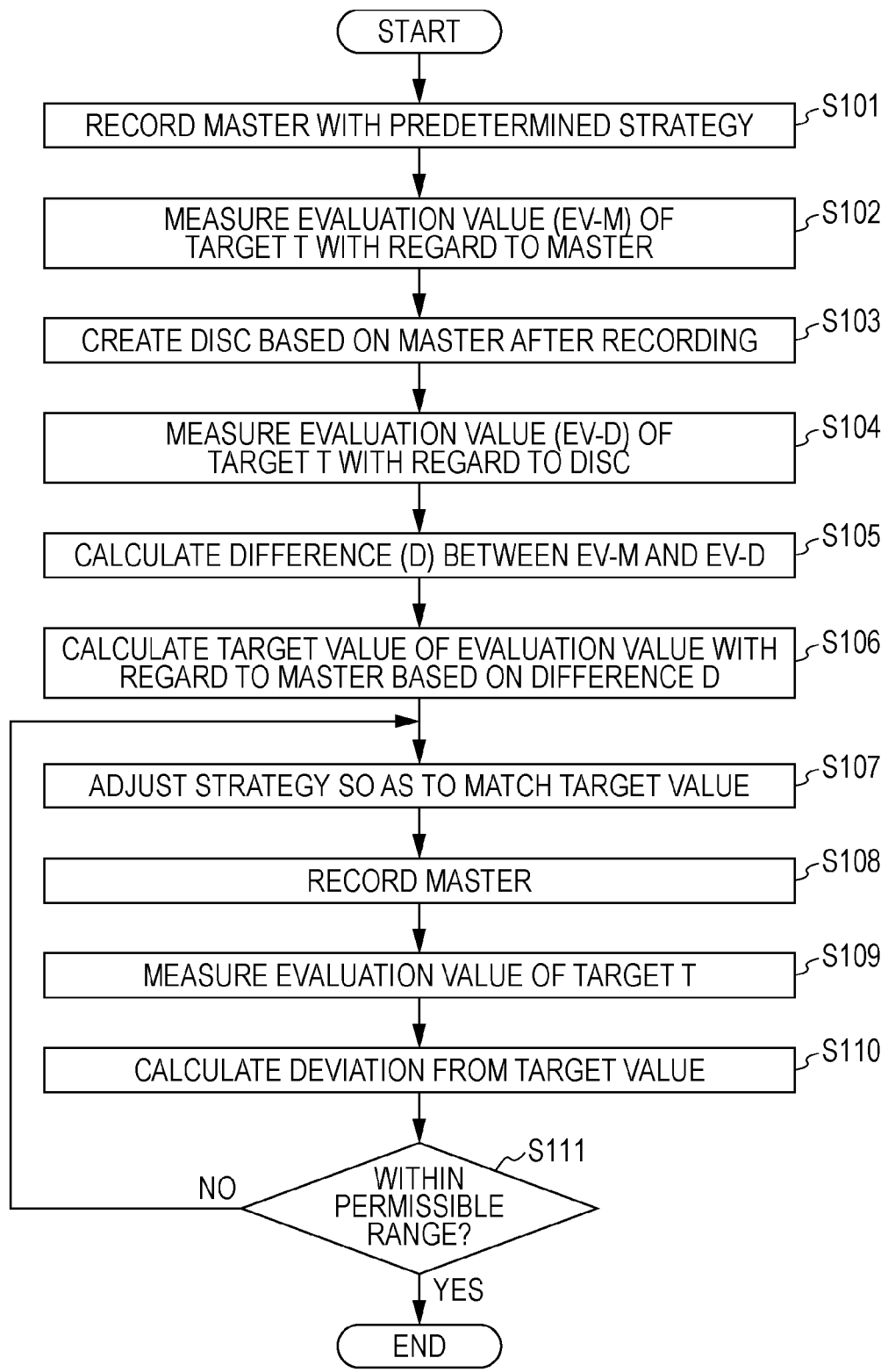
FIG. 3 is a flowchart for describing a concept of a master strategy adjustment method according to an embodiment.

In FIG. 3, first, in step S101, master recording is performed with a predetermined strategy. That is, recording of a predetermined test pattern with regard to the inorganic resist master 102 is performed in a state where a predetermined strategy is set using the master recording device 1.

Here, as the predetermined strategy described above, for example, it is sufficient to set a strategy which is determined in advance so as to be set to correspond to an initial master recording in terms of strategy adjustment such as an initial strategy.

An instruction at the time of setting the strategy or starting the recording is able to be performed using operational input via the operation section 26 shown in FIG. 2.

Next, in step S102, measurement of the evaluation value of a target T (T: channel clock) is performed with regard to the master. That is, the evaluation section 25 performs measurement of the evaluation value with regard to predetermined code lengths which are determined in advance as targets of evaluation value measurement out of each code length (length T) which is included in the recording signal as a test pattern which was recording in the master 102 in step S101.

Here, there is the notation of evaluation value EV-M with regard to the evaluation value which is measured by the evaluation section 25 with regard to the recording signal of the master 102 in this manner.

Next, in step S103, a disc is formed based on the master after recording. That is, an optical disc recording medium is formed by the development process (FIG. 1D) to the forming process of the protection film 107 (FIG. 1J) being performed as described in FIG. 1 based on the master 102 after recording.

Then, next, in step S104, measurement of the evaluation value of the target T is performed with regard to the disc. That is, the measurement of the evaluation value of the target T which is included in the recording signal is performed for each length T with regard to the optical disc which was formed in step S103.

The measurement of the evaluation value of the optical disc in step S104 is performed using an evaluation device with regard to the optical disc and not the master recording device 1. Here, since the configuration of the evaluation device of the optical disc is common knowledge (a device which measures the evaluation value with regard to the edge position, code length, and the like), a description using a diagram will be omitted here.

Below, the evaluation value with regard to the optical disc which was measured in step S104 is evaluation value EV-D.

Next, in step S105, a difference D of the evaluation value EV-M and the evaluation value EV-D is calculated. The calculation of the difference D may be performed by an operator or may be calculated by the information of each of the evaluation values EV being input into a predetermined information processing device.

Next, in step S106, the target value of the evaluation value with regard to the master is calculated based on the difference D. Here, also in regard to the calculation of the target value, the calculation may be performed by the operator themselves or may be calculated by information being input into a pre-determined information processing device.

Here, the calculation sequence of the target value based on the difference D will be described with reference to FIGS. 4A and 4B.

Figure 4A:
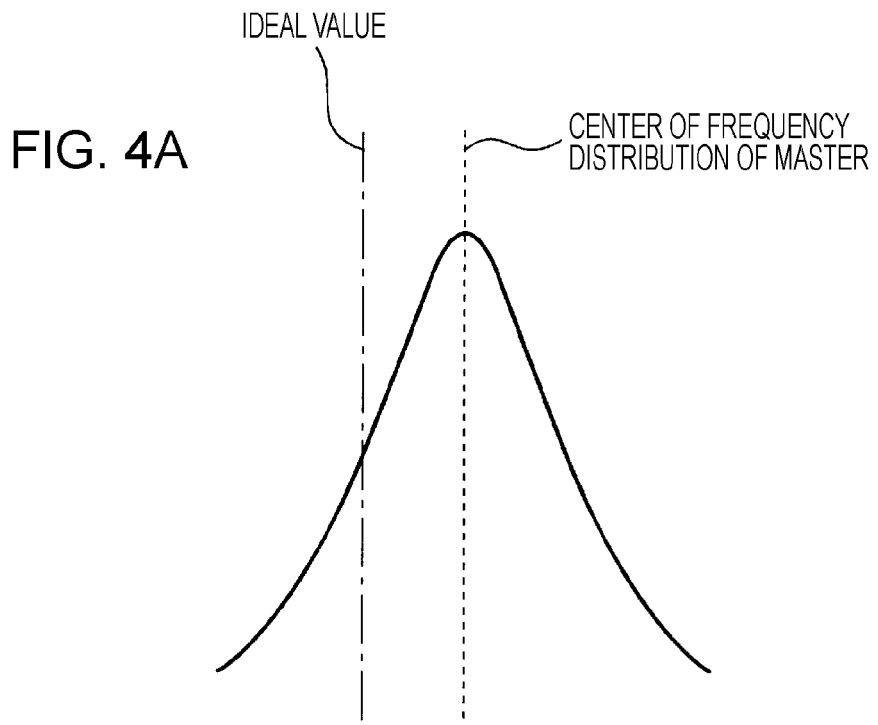
FIGS. 4A and 4B are diagrams for describing a target value calculation sequence based on a difference.
Figure 4B:
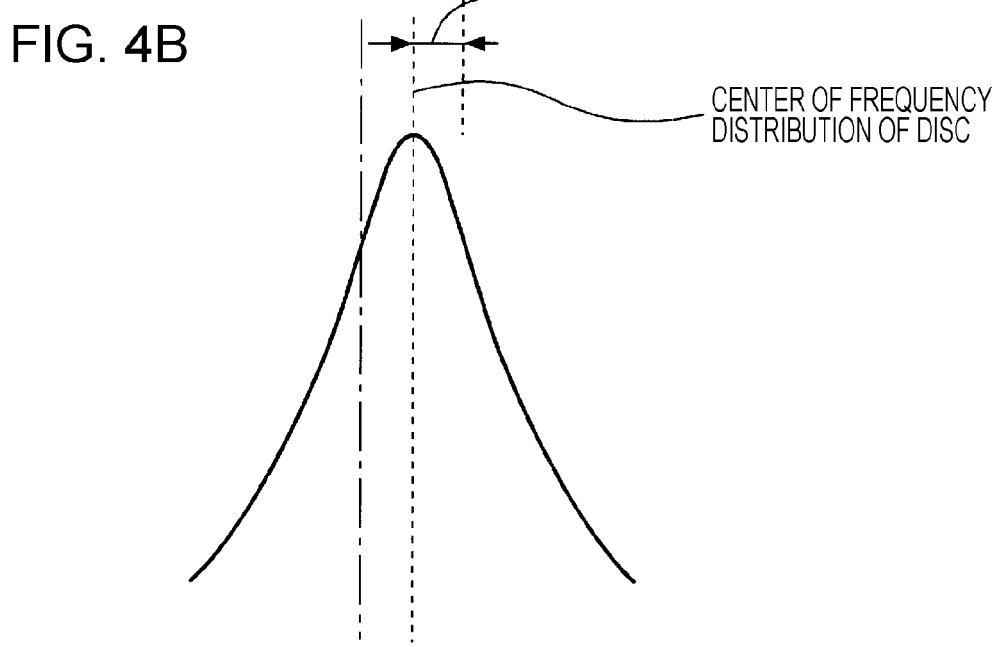

FIG. 4A illustrates a frequency distribution with regard to a certain code length in the master 102 and FIG. 4B illustrates a frequency distribution with regard to the same code length which is measured with regard to the optical disc which is formed based on the master 102.

As described above, there is deviation in the evaluation value measurement result with regard to the master and the evaluation value measurement result with regard to the optical disc. In FIGS. 4A and 4B, a case is shown as one example where the center (average) of the frequency distribution of the code length in the master considerably deviates from an ideal value thereof and the center of the frequency distribution of the code length in the optical disc does not deviate to that extent from an ideal value thereof.

The calculation of the difference D of the evaluation value EV-M and the evaluation value EV-D in step S106 described above is equivalent to calculation of a portion of "D" shown in FIG. 4.

That is, since the evaluation value which is measured with regard to the master is able to be taken as an offset with the evaluation value of the disc side by the difference D, it is possible to achieve matching of the evaluation value which is measured at the disc side with the ideal value as a result of having a value which is offset from the ideal value based on the difference D (that is, a value where a correction is applied using the difference D) as the target and not the ideal value as a target in the master strategy adjustment.

Specifically, for example, if the center of the frequency distribution of the master is deviated by "1.0" from the ideal value and the disc side is deviated by only "0.5" from the ideal value, it is possible to achieve matching of the center position at the disc side and the ideal value by setting the target value of the master to a value which is deviated by "0.5" from the ideal value.

The description will return to FIG. 3.

After the calculation of the target value is performed based on the difference D in step S106, the strategy is adjusted so as to match the target value in step S107.

Here, in relation to the recording with regard to the master, even if the amount which the pit position is to be moved is made clear due to the calculation of the target value, it is not necessarily unequivocally determined to which extent the strategy is to be adjusted by moving in this amount. For example, when the front edge is moved, development where the effect thereof moves the rear edge may occur, and it is extremely difficult to derive the relationship between the strategy adjustment amount and the amount of actual movement of the pit in advance.

Due to these circumstances, in this example, the adjustment of the strategy to match the target value is performed with so-called trial and error as a base is where an operator inputs instructions on the strategy which is estimated from the target value to the master recording device 1, the evaluation value of the signal which is recorded due to this is measured, and the recording is executed again by resetting of the instructions of the strategy after correction being performed in a case where further correction is necessary from the measurement result.

Specifically, after the adjustment of the strategy so as to match the target value in step S107 described above (setting of the instructions of the strategy by the operator), the master recording is performed in a state where the strategy after adjustment is set in step S108, and furthermore, next, in step S109, the evaluation value of target T is measured.

Then, next, in step S110, the deviation with the target value is calculated. Here, with regard to the calculation of the deviation of the measurement result in step S109 and the target value in this manner, the calculation may be executed by the master recording device 1 or may be performed by the operator or the like based on the information of the measurement result which is displayed in the display section 27.

Next, in step S111, it is identified whether or not the deviation which is calculated in step S110 is within a permissible range. Then, it is identified whether or not the amount of deviation which has been calculated is a value in a predetermined range which is set in advance.

In step S111, in a case where a negative result is obtained such that the deviation amount which has been calculated as described above is not in the permissible range, the sequence returns to step S107.

Due to this, the processes from step S107 to S110, that is, the readjustment of the strategy according to the amount of deviation, the master recording using the strategy after readjustment, the measurement of the evaluation value, and the calculation of the deviation with the target value is executed until the amount of deviation is within a permissible range. In other words, strategy adjustment is performed so that the evaluation value of the master is made to be within the predetermined permissible range where the target value is a reference.

On the other hand, in a case where an affirmative result is obtained in step S111 such that the amount of deviation which is calculated as described above is within the permissible range, the sequence for adjusting the master strategy shown in the diagram is complete.

Here, after the sequence for adjusting the master strategy shown in FIG. 3 is complete (that is, the derivation of the strategy which is optimal is complete), recording is newly performed with regard to the inorganic resist master 102 in a state where the strategy which is finally been adjusted is set (the strategy when in the permissible range).

Hereinafter, the development process (FIG. 1D) to the forming process of the protection film 107 (FIG. 1J) described in FIG. 1 are performed with regard to the master 102 after recording and the optical disc recording medium is formed as a product.

Due to this, it is possible to realize a high-quality optical disc product as a result of an optical disc product being formed based on the master where recording has been performed using the optimal strategy which is derived based on the evaluation value of the optical disc recording medium which was actually formed.

Figure 8:
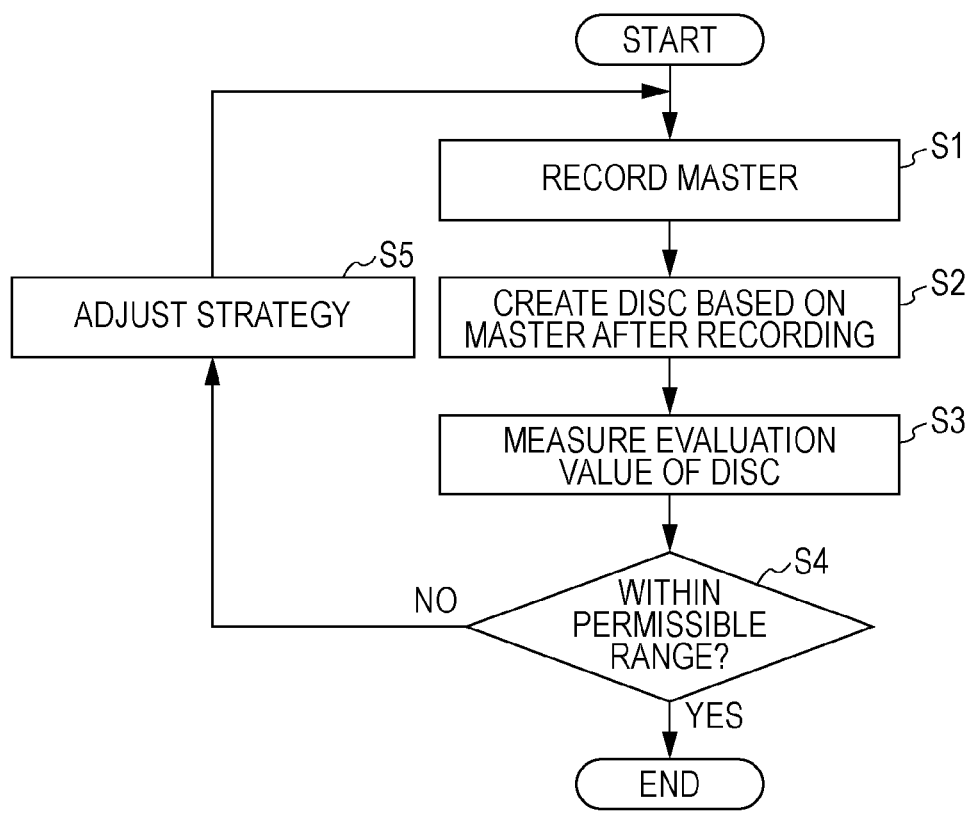
FIG. 8 is a flowchart illustrating a specific sequence of master strategy in the related art.

According to the master strategy adjustment sequence which is described as above, the number of times of forming the optical disc recording medium which is necessary in terms of strategy adjustment is able to be suppressed to one, and as a result, it is possible to considerably simplify the operation processes in strategy adjustment compared to a case of the strategy adjustment sequence of the related art which was described with FIG. 8 and an improvement in operation efficiency is able to be achieved. In addition, prevention of waste of materials in the forming of optical discs is able to be achieved due to a reduction in the number of time of forming optical discs.

In addition, according to the master strategy sequence due to the description described above, it is possible to realize a high-quality optical disc recording medium based on the evaluation value of the optical disc recording medium which is actually formed.

According to the master strategy adjustment sequence of the embodiment, it is possible for an improvement of operational efficiency of master strategy adjustment and prevention of waste of material in forming of optical discs to be achieved by achieving a reduction in the number of times of forming unnecessary optical discs for strategy adjustment while achieving prevention of a reduction in product quality of the optical discs as final products.

In addition, in the example, it is possible that it is not necessary for the development process of the master to be carried out again in the measurement of the evaluation value of the master since the PTM method is adopted in relation to the master recording process.

In regard to this point, an improvement of operational efficiency of master strategy adjustment is able to be achieved.

At this time, in the embodiment, strategy adjustment, recording, and measurement of the evaluation value (S107 to S111) are performed until the evaluation value of the master is in the permissible range where the target value is a reference is performed after the target value is set with regard to the evaluation value of the master, but it is possible to further utilize the merit of PTM recording, that is, the merit of operational efficiency improvement where the reading out of a signal is possible with regard to the master before the development process due to the strategy adjustment process being provided according to the target value in this manner.

[4. Improving Reliability of Master Evaluation Value]

Here, as is understood from the description up until here, the measurement of the evaluation value with regard to the master 102 after recording is performed by laser light being illuminated with regard to the master 102 after recording and the reproduction signal (RF signal) being obtained based on the reflected light.

In a case where the reproduction signal is obtained from the master 102 due to the sequence in this manner, there is a concern that it is difficult to appropriately perform separation of the code lengths and the reliability of the measurement result of the evaluation value for each code length is reduced.

Figure 5A:
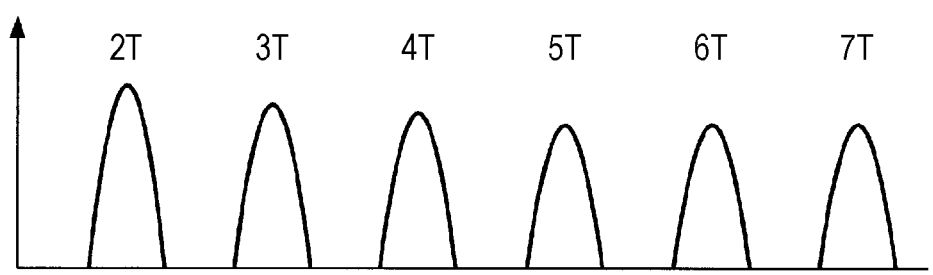
FIGS. 5A and 5B are diagrams for describing a reduction in reliability of a master evaluation value.
Figure 5B:
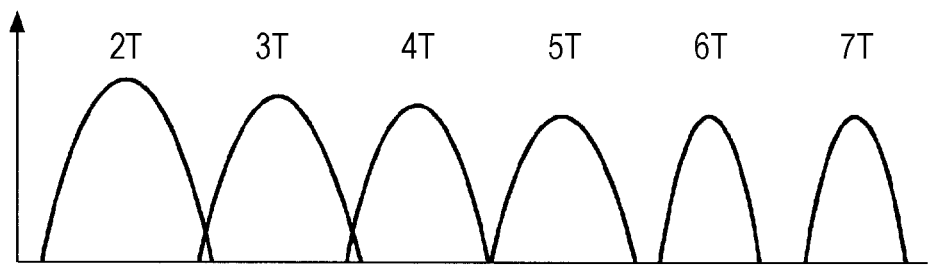

FIGS. 5A and 5B are diagrams for describing this point, FIG. 5A illustrates a frequency distribution for each code length (frequency distribution for each code length with regard to 2 T to 7 T) in a state where the separation of the code lengths is excellent and FIG. 5B illustrates a frequency distribution for each code length (with regard to 2 T to 7 T in the same manner) in a case where the reproduction signal is obtained by direct laser light being illuminated with regard to the master 102.

In a case where the reproduction signal is obtained by direct laser light being illuminated with regard to the master 102, the separation of the code lengths is poor in particular in regard to the short code lengths of 2 T and 3 T, and as a result, there is a concern that there is a reduction in the reliability of the measurement result of the evaluation value for each code length by the evaluation value which is originally to be classified as the code length of 2 T is classified as the evaluation length of 3 T as shown in FIG. 5B or the opposite phenomenon occurring.

Therefore, in the example, the measurement of the evaluation for each code length is performed as below so as to achieve prevention of a reduction in the reliability of the evaluation value in this manner.

That is, by the code pattern which is recorded in the master 102 being stored in the memory or the like and the recording code pattern being synchronized with the reproduction signal which is obtained by reading out the code pattern which is actually recorded in the master 102, that the code length in the reproduction signal which is currently being read out corresponds to which code length is appropriately grasped. In other words, the current code length is appropriately grasped by performing pattern matching of the recording code pattern and the reproduction signal.

Figure 6:
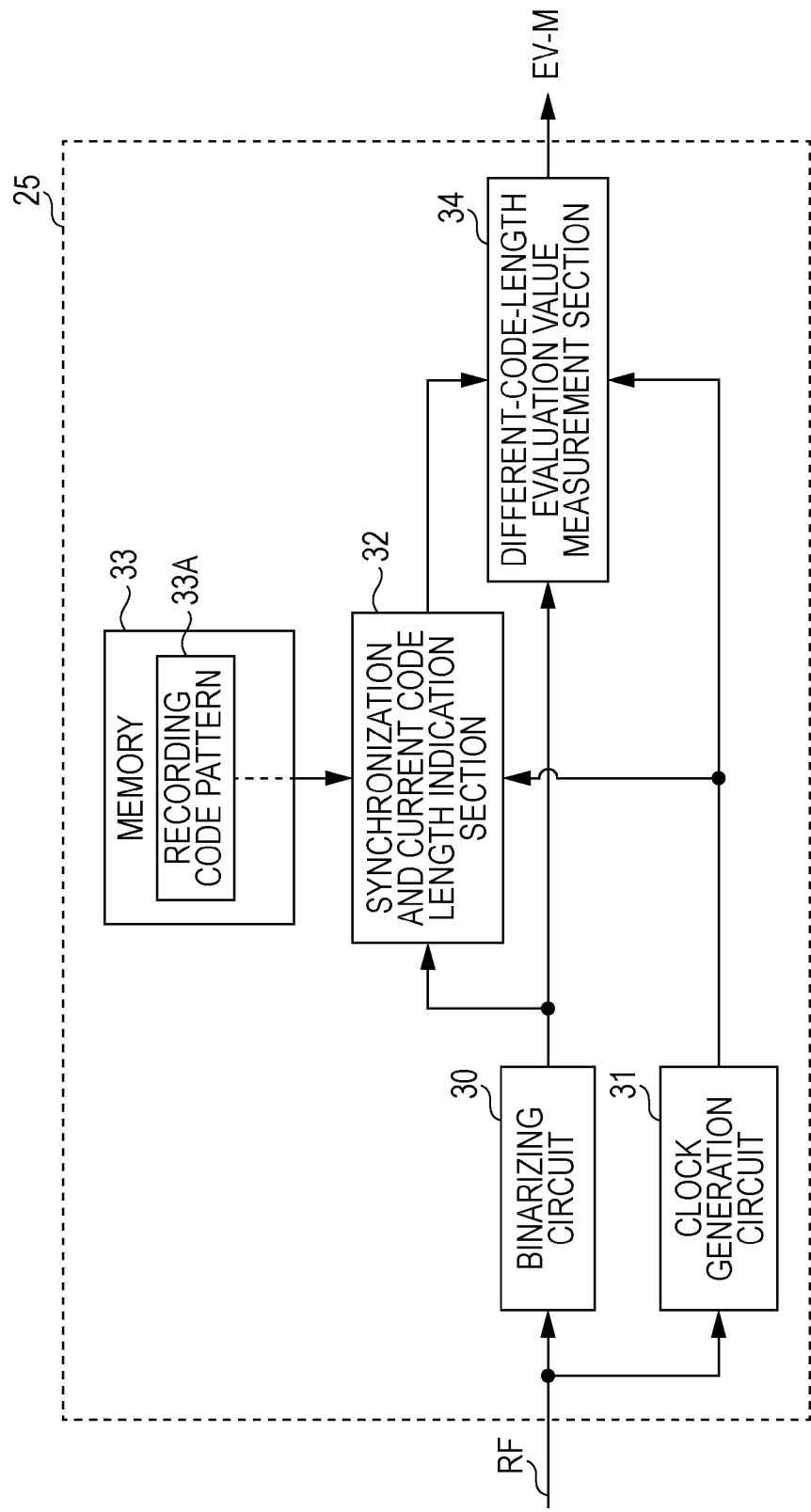
FIG. 6 is a diagram which is an example of an internal configuration of an evaluation section where grasping of code length is possible due to pattern matching.

FIG. 6 shows an example of an inner configuration of the evaluation section 25 where it is possible for the code length to be grasped using pattern matching in this manner.

In FIG. 6, the evaluation section 25 in this case is provided with a binarizing circuit 30, a clock generation circuit 31, a synchronization and current code length indication section 32, a memory 33, and a different-code-length evaluation value measurement section 34.

First, in this case, a recording code pattern 33A which is to be recorded with regard to the master 102 is stored in the memory 33.

The information which is the recording code pattern 33A is able to be read out using the synchronization and current code length indication section 32.

In this case, the RF signal from the reflected light calculation circuit 23 shown in FIG. 1 is input to the binarizing circuit 30 and the clock generation circuit 31.

The binarizing circuit 30 binarizes the RF signal. The RF signal which is binarized (referred to as below as the binarized RF signal) is supplied to the synchronization and current code length indication section 32 and the different-code-length evaluation value measurement section 34.

The clock generation circuit 31 generates a reproduction clock which is synchronized with the RF signal based on the RF signal. The reproduction clock is supplied to the synchronization and current code length indication section 32 and the different-code-length evaluation value measurement section 34.

The synchronization and current code length indication section 32 synchronizes the binarized RF signal and the recording code pattern 33A.

Specifically, the synchronization in this case is performed in consideration of the problem of code separation which was described previously with FIG. 5 and in view of matching a signal portion of the code lengths which are equal to or more than a predetermined length where code separation is excellent (where there is no overlap in the code length distribution). Specifically, in a case where the optical disc is formed as a BD as in the example, for example, the binarized RF signal and the recording code pattern are synchronized in view of the 7 T signal portion.

The synchronization and current code length indication section 32 indicates the current code length to the different-code-length evaluation value measurement section 34 based on the recording code pattern 33A after synchronization.

To describe in order for confirmation, the synchronization and current code length indication section 32 performs indication of the current code length based on the recording code pattern 33A after synchronization in this manner in accordance with the reproduction clock.

The different-code-length evaluation value measurement section 34 perform measurement of the evaluation value for each code length based on the binarized RF signal in accordance with information on the current code length which is indicated from the synchronization and current code length indication section 32. In other words, the evaluation value which is measured based on the binarized RF signal is classified and held for each code length in accordance with information on the current code length which is indicated from the synchronization and current code length indication section 32.

In this case, the evaluation value of at least the leading edge position and the trailing edge position is measured as the evaluation value and the different-code-length evaluation value measurement section 34 uses the reproduction clock in the measurement of these evaluation values.

Due to the configuration as described above, it is possible to appropriately grasp the code lengths due to pattern matching with regard to the reproduction signal from the master 102, and as a result, it is possible to achieve an improvement in the reliability of the evaluation value of the master.

In addition, by increasing the reliability of the evaluation value measurement result, it is possible to efficiently perform the matching with the target value, and as a result, a further improvement in efficiency of the strategy adjustment operation is able to be achieved.

[5. Confirmation Process]

In addition, in the concept of the master adjustment strategy sequence which was described previously using FIG. 3, the strategy adjustment is completed according to the evaluation value which is measured with regard to the master 102 is in the permissible range where the target value is a reference, but with the meaning of more reliably improving the product quality of the optical disc, it is possible to form the optical disc again and perform measurement of the evaluation value thereof and to confirm whether or not the evaluation value is in a predetermined permissible range where the ideal value is a reference after the evaluation value of the master is in the permissible range in this manner.

Then, in a case where the evaluation value of the optical disc is not in the permissible range described above as a result of performing the confirmation process in this manner, the adjustment of the strategy is performed again. Specifically, the strategy adjustment is performed so that the target value with regard to the evaluation value of the master is corrected in accordance with the amount of deviation of the evaluation value and the ideal value of the optical disc and the evaluation value of the master is matched again to the target value after the correction based on the target value which has been corrected.

It is possible to achieve a more reliable improvement in the product quality of the optical disc by performing master strategy adjustment again according to the confirmation process and the result thereof in this manner.

[6. Specific Strategy Adjustment Method]

Figure 7:
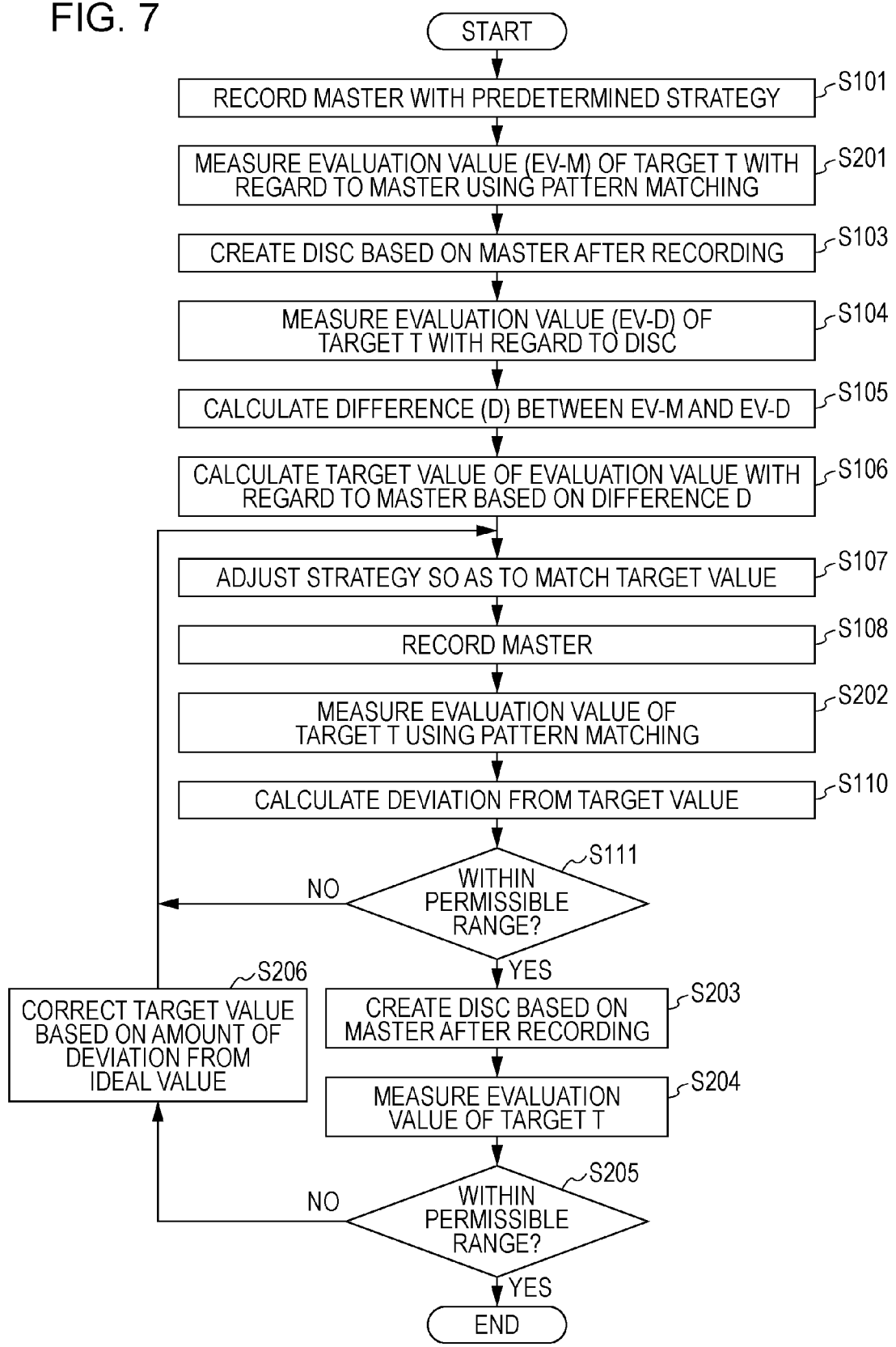
FIG. 7 is a flowchart for describing a specific master strategy adjustment sequence which includes a process for improving reliability of a master evaluation value and a confirmation process.

FIG. 7 is a flowchart for describing a specific master strategy adjustment sequence which includes a process for improving the reliability of the master evaluation value (pattern matching) and the confirmation process which have been described using the description above.

Here, in FIG. 7, with regard to the sequences which have the same content as that already described in FIG. 3, description will be omitted by attaching the same step number.

As is understood with comparison with FIG. 3, the sequence of step S201 is executed instead of step S102 in FIG. 3 and the sequence of step S202 is executed instead of step S109 in this case. Furthermore, in this case, the sequences of S203 to S205 and step S206 as necessary are executed in a case where an affirmative result is obtained in step S111, that is, in a case where the evaluation result of the master is in the permissible range based on the target value.

First, step S201 and step S202 are both sequences in the measurement of the evaluation value with regard to the master 102 after recording. Specifically, step S201 is a sequence which is executed after the initial master recording which is step S101 and step S202 is a sequence which is executed after the master recording after the setting of the target value which is step S109.

In step 201 and step 202, the evaluation value of the target T (EV-M) is measured using pattern matching as the measurement of the evaluation value with regard to the master. That is, the evaluation value 25 shown in FIG. 6 measures the evaluation value for each code length which is a target using the pattern matching described above.

In addition, in step S203 after an affirmative result is obtained in step S111, a disc is formed based on the master after recording. That is, an optical disc is formed based on the master 102 after the evaluation value is identified as being in the permissible range where the target value is a reference.

Next, in step S204, the evaluation value of the target T is measured with regard to the optical disc which has been formed. The measurement target of the evaluation value here is a section which corresponds to a recording section on the master which is recorded in a state where the strategy, when it is identified as in the permissible range in step S111, is set.

Then, next, in step S205, it is identified whether or not the evaluation value is in the permissible range. That is, it is identified whether or not the evaluation value which is measured in step S204 is in the permissible range where the ideal value is a reference.

In a case where a negative result is obtained where the evaluation value is not in the permissible range in step S205, the sequence proceeds to step S206 and the target value is corrected based on the amount of deviation with the ideal value. That is, correction of the target value is performed so that amount of deviation with the evaluation value which is measured in step S204 and the ideal value is cancelled out.

After the target value is corrected, the sequence returns to step S107 as shown in the diagram. Due to this, readjustment of the master strategy is performed based on the target value after correcting.

On the other hand, in a case where an affirmative result is obtained where the evaluation value is in the permissible range in step S205, the sequence for master strategy adjustment shown in the diagram is complete.

[7. Modified Examples]

Below, the embodiment according to the present disclosure was described, but the present disclosure is not to be limited to the specific examples described up until here.

For example, the recording method with regard to the master is not limited to the PTM method. In a case where development is necessary for the reading out with regard to the recording signal of the master, it is sufficient if reading out of the signal (measurement of the evaluation value) is performed by illumination of laser light with regard to the master 103 after development.

In addition, a case is shown as an example where the evaluation value measurement method is adopted where pattern matching is used in order to achieve an improvement in the reliability of the evaluation value of the master, but the evaluation value measurement method using pattern matching in this manner is able to also be applied when measuring the evaluation value with regard to the optical disc.

In addition, in the description up until here, there is an example where the evaluation value with regard to the edge position (which also includes the evaluation value with regard to pit length) is measured as the evaluation value which is the evaluation indictor of the quality of the recording signal of the master and the optical disc, but for example, it is also possible to perform strategy adjustment based on other evaluation values such as jitter and asymmetry.

In either case, it is sufficient if an evaluation indicator of the quality of the recording signal is used as the evaluation value.

In addition, the present disclosure is able to be appropriately applied to the manufacturing of optical discs where information is recorded with a combination of pits and lands and is able to applied to not only the manufacturing of so-called ROM type optical discs, but also the manufacturing of optical discs if it is an optical disc which has a portion where information is recorded with a combination of pits and lands even if it is an optical disc which is a write-once type or a rewritable type.

It should be understood by those skilled in the art that various modifications, combinations, sub-combinations and alterations may occur depending on design requirements and other factors insofar as they are within the scope of the appended claims or the equivalents thereof.

What is claimed is:

1. A master strategy adjustment method comprising:
   performing first recording with regard to a disc master in a state where a predetermined writing strategy is set;
   performing first measurement of an evaluation value which is an evaluation indicator of signal quality with regard to a signal which is recorded with regard to the disc master in the performing of first recording;
   forming a first optical disc recording medium based on the disc master where recording has been performed in the performing of first recording;
   performing second measurement of an evaluation value with regard to a recording signal of the optical disc recording medium which was formed in the forming of the first optical disc;
   calculating of a target value of the evaluation value with regard to the disc master based on a difference with the evaluation value which was measured in the performing of first measurement and the evaluation value which was measured in the performing of second measurement; and
   adjusting a first writing strategy which was set in the performing of first recording so that the evaluation value with regard to the disc master matches the target value, performing a second recording with regard to the disc master in a state where the adjusted writing strategy is set, performing measurement of the evaluation value with regard to the recording signal of the disc master obtained after the second recording is performed, and performing a process, where it is determined whether or not the evaluation value which has been measured is at least a value within a predetermined range with the target value set as a reference, until an affirmative result is able to be obtained in the determination.

2. The master strategy adjustment method according to claim 1,
   wherein the recording with regard to the disc master is performed using a PTM (Phase Transition Mastering) method.

3. The master strategy adjustment method according to claim 2,
   wherein the evaluation value is measured for each code length which is a target, and
   in at least the measurement of the evaluation value with regard to the disc master for each code length, classification of each code length is performed, with a recording code pattern which is to be recorded in the disc master stored in advance being synchronized with a reproduction signal from the disc master, based on the recording code pattern which has been synchronized.

4. The master strategy adjustment method according to claim 3,
   wherein the synchronization of the recording code pattern with regard to the reproduction signal is performed in view of the matching of the code lengths which are equal to or greater than a predetermined length with no overlap in code length distribution out of each of the code lengths which are included in the recording code pattern and the reproduction signal.

5. The master strategy adjustment method according to claim 4, further comprising:
   performing second recording with regard to the disc master in a state where the writing strategy, which is determined in the adjusting of the first writing strategy, is set;
   forming a second optical disc recording medium based on the disc master where recording has been performed in the performing of second recording; and
   performing third measurement of an evaluation value with regard to a recording signal of the optical disc recording medium which was formed in the forming of the second optical disc.

6. The master strategy adjustment method according to claim 5, further comprising:
   performing correction of the target value based on the difference of the evaluation value which was measured in the performing of third measurement and an ideal value thereof; and
   adjusting the second writing strategy which was determined in the adjusting of the first writing strategy so that the evaluation value with regard to the disc master matches the target value which has been corrected in the performing correction of the target value, performing recording with regard to the disc master in a state where the adjusted writing strategy is set, performing measurement of the evaluation value with regard to the recording signal of the disc master, and performing a process, where it is determined whether or not the evaluation value which has been measured is at least a value within a predetermined range with the corrected target value set as a reference, until an affirmative result is able to be obtained in the determination.

7. A disc manufacturing method comprising:

performing first recording with regard to a disc master in a state where a predetermined writing strategy is set;

performing first measurement of an evaluation value which is an evaluation indicator of signal quality with regard to a signal which is recorded with regard to the disc master in the performing of first recording;

forming a first optical disc recording medium based on the disc master where recording has been performed in the performing of first recording;

performing second measurement of an evaluation value with regard to a recording signal of the optical disc recording medium which was formed in the forming of the first optical disc;

calculating of a target value of the evaluation value with regard to the disc master based on a difference with the evaluation value which was measured in the performing of first measurement and the evaluation value which was measured in the performing of second measurement;

adjusting the writing strategy which was set in the performing of first recording so that the evaluation value with regard to the disc master matches the target value, performing a second recording with regard to the disc master in a state where the adjusted writing strategy is set, performing measurement of the evaluation value with regard to the recording signal of the disc master obtained after the second recording is performed, and performing a process, where it is determined whether or not the evaluation value which has been measured is at least a value within a predetermined range with the target value set as a reference, until an affirmative result is able to be obtained in the determination;

performing third recording with regard to the disc master in a state where the strategy is set based on the writing strategy which is set when the affirmative result was obtained in the determination; and forming a third optical disc recording medium based on the disc master where recording has been performed in the performing of third recording.

* * * * *